UNITED STATES PATENT OFFICE.

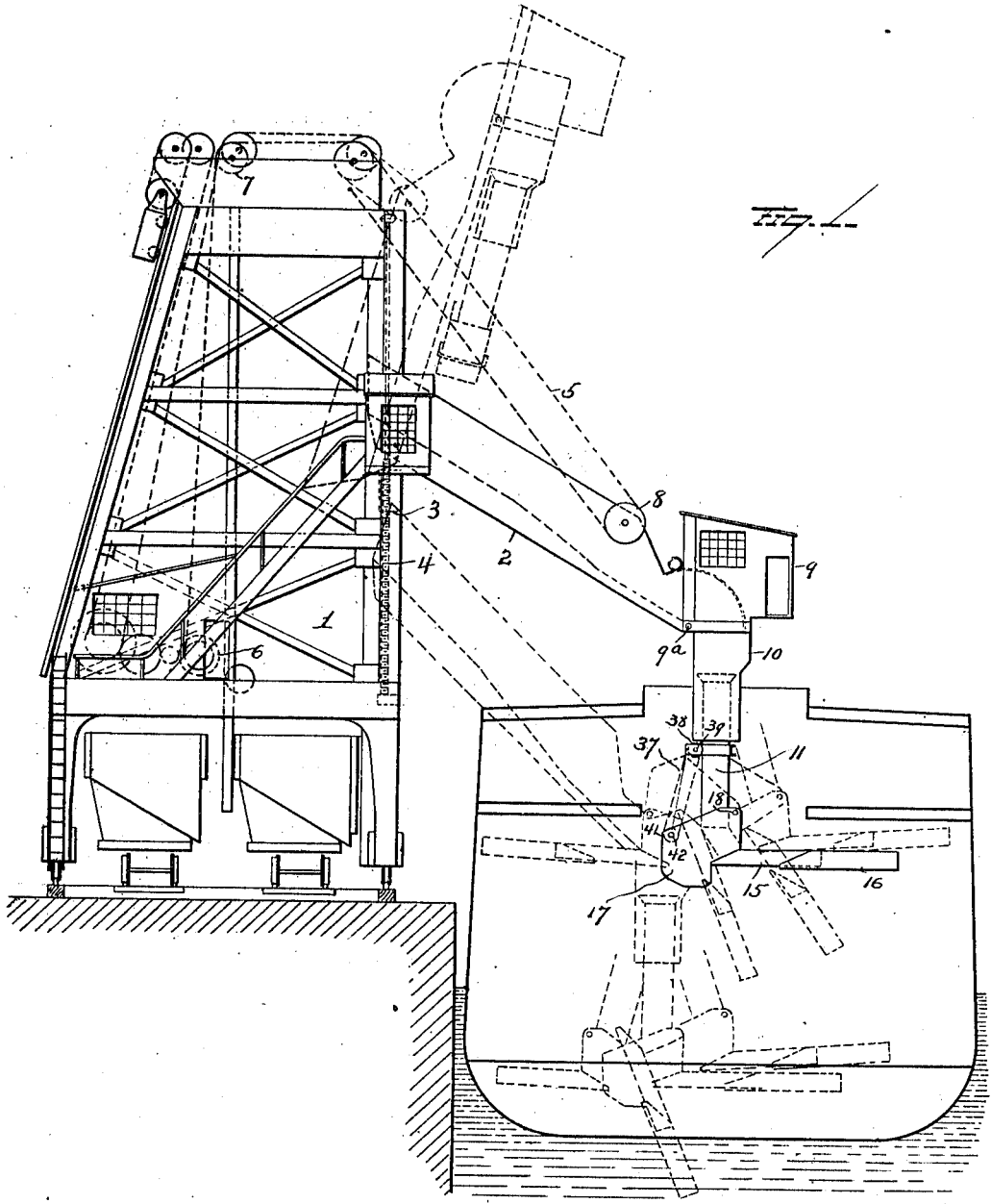

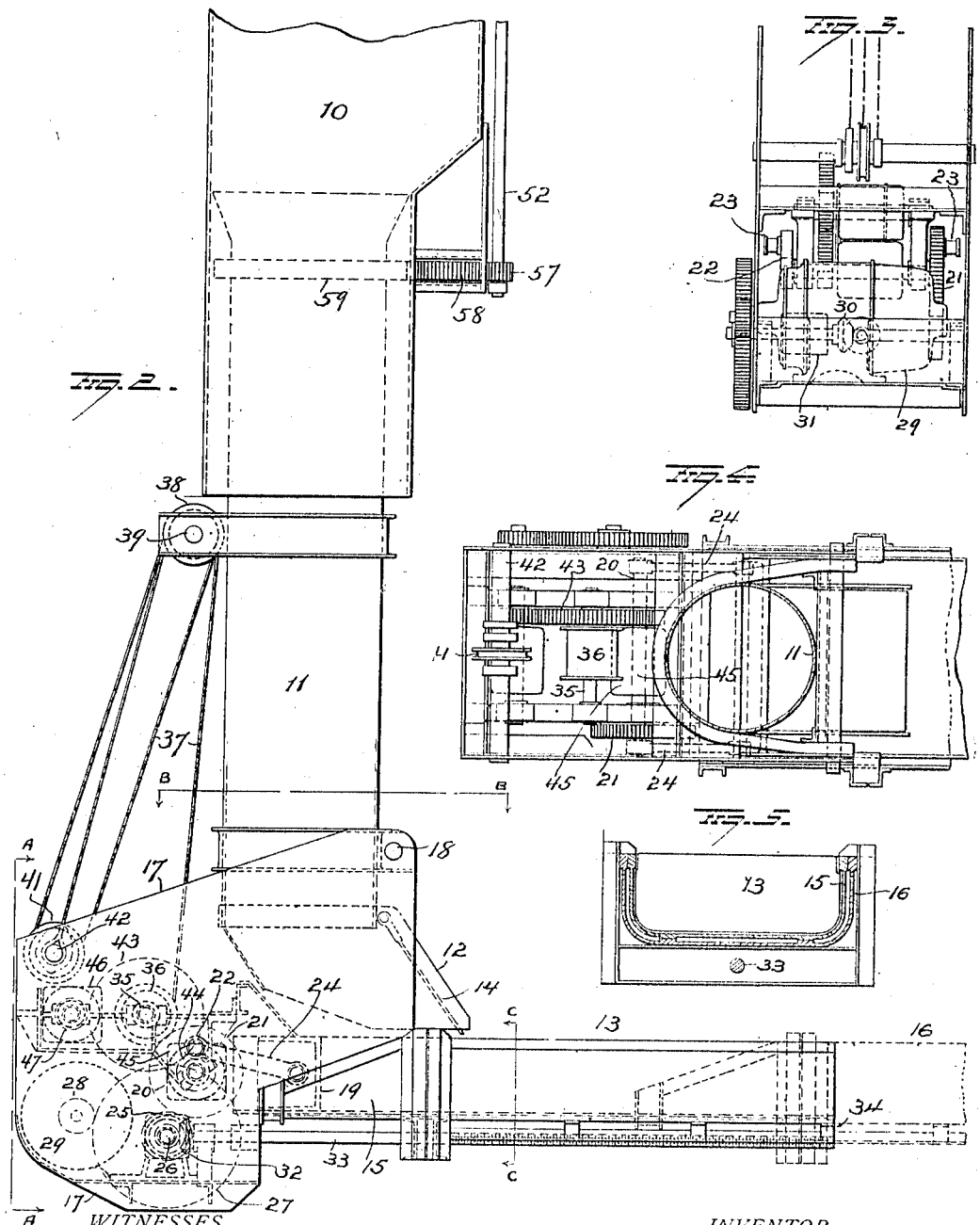

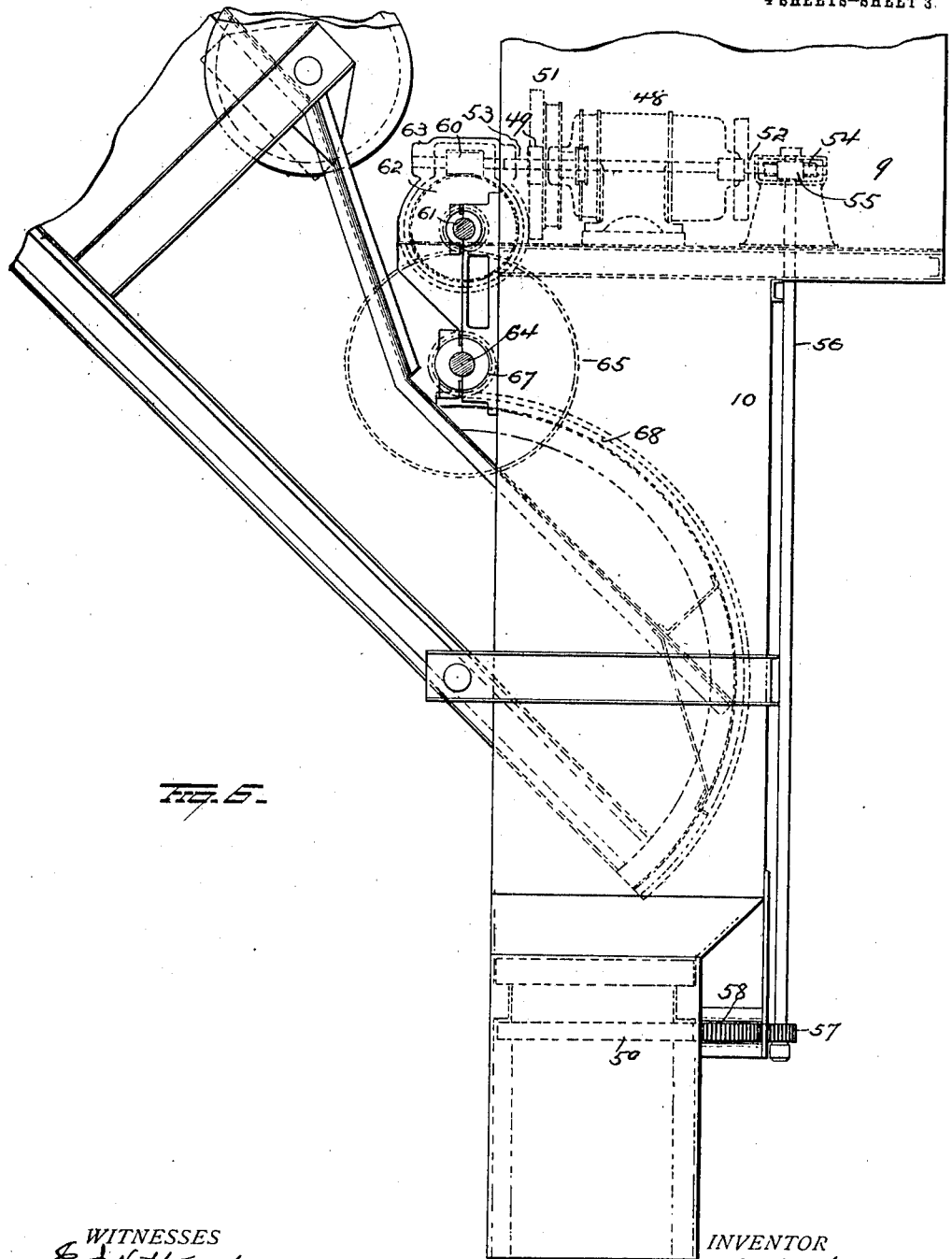

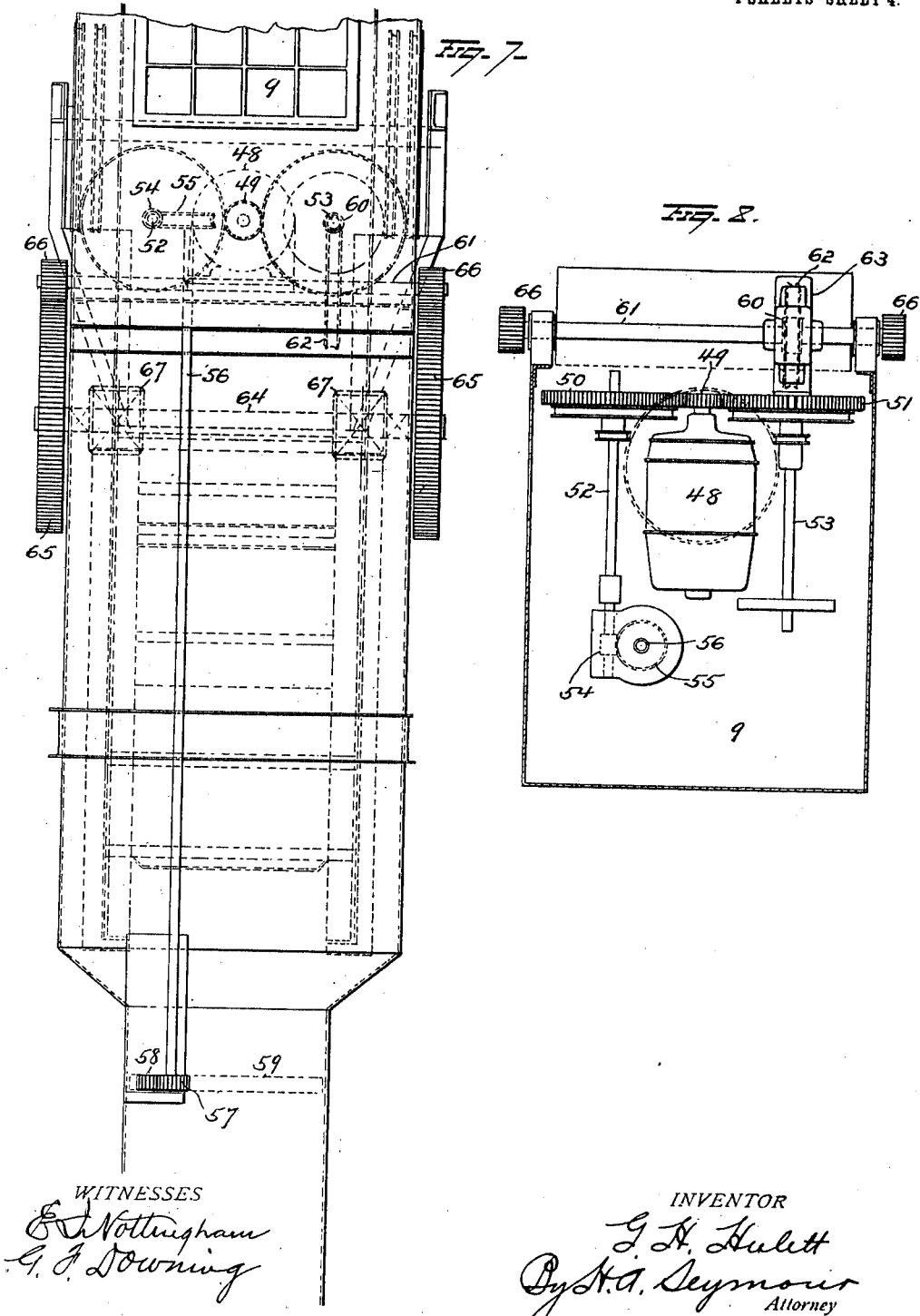

GEORGE H. HULETT, OF CLEVELAND, OHIO, ASSIGNOR TO THE WELLMAN-SEAVER-MORGAN COMPANY, OF CLEVELAND, OHIO.

LOADING AND TRIMMING MECHANISM FOR BOATS.

1,010,767.

Specification of Letters Patent.     Patented Dec. 5, 1911.

Application filed November 30, 1910. Serial No. 594,925.

*To all whom it may concern:*

Be it known that I, GEORGE H. HULETT, of Cleveland, in the county of Cuyahoga and State of Ohio, have invented certain new and useful Improvements in Loading and Trimming Mechanism for Boats; and I do hereby declare the following to be a full, clear, and exact description of the invention, such as will enable others skilled in the art to which it appertains to make and use the same.

This invention relates to improvements in loading and trimming mechanism for boats,—one object of the invention being to so construct a machine of the character specified that coal or other material can be readily distributed under the decks of a boat.

A further object is to provide trimming mechanism which shall be adaptable for use with any type of dumping machine, or which may be attached to the chute of a coal trestle.

A further object is to so construct a load trimmer that it can be readily raised or lowered, and so that it can be swung inwardly or outwardly.

A further object is to construct the trimmer in such manner that its discharge portion can be rotated and disposed at different angles under the decks of a boat.

A further object is to provide a trimming machine having a telescopic discharge chute, with simple and efficient means for lengthening and shortening said chute.

A further object is to provide simple and efficient means for positively discharging material from the chute of boat trimming machinery.

With these and other objects in view the invention consists in certain novel features of construction and combinations of parts as hereinafter set forth and pointed out in the claims.

In the accompanying drawings, Figure 1 is a view in elevation showing an embodiment of my invention; Fig. 2 is an enlarged side elevation of the lower portion of the trimming mechanism; Fig. 3 is a rear end view partly in section on the line A—A of Fig. 2; Fig. 4 is a sectional view on the line B—B of Fig. 2; Fig. 5 is a sectional view on the line C—C of Fig. 2; and Figs. 6, 7 and 8 are enlarged views showing the mechanism for operating the depending leg.

1 represents a traveling tower, in which suitable mechanism is provided for elevating a dump car to a proper position to have its contents discharged onto a pan or apron 2 which projects outwardly from the tower so as to be disposed over a boat alongside the dock on which the traveling tower may be located. The pan or apron 2 is pivotally attached to a member 3 and the latter is vertically adjustable by means of threaded rods 4, to which motion may be imparted by any suitable driving mechanism. By these means, the inner ends of the pan or apron may be raised or lowered to adjust the height of the same to accommodate the same to boats of different heights. It is also desirable to provide means whereby the outer end of the pan or apron and the mechanism (hereinafter described) can be raised or lowered. For this purpose, a cable 5 is provided, and operated by a suitably driven drum 6 on the tower. From this drum, the cable 5 extends upwardly and over suitable pulleys 7 at the top of the tower; then downwardly and about a pulley 8 on the forward portion of the pan or apron, and from this pulley, the cable extends upwardly and its end is suitably secured to the upper portion of the tower.

The upper member 10 of a depending leg is pivotally supported at 9ª by the forward end of the pan or apron 2 and at the upper end of said member, a cage or housing 9 is located. The lower member 11 of the depending leg is made tubular and its upper portion is revolubly mounted within the leg member 10. The lower or revoluble leg member 11 is made with a forwardly inclined outlet spout 12 to discharge into a telescopic chute 13, and the upper side of said spout is composed of a swinging door or gate 14 which will yield sufficiently to prevent clogging of material in said spout. The telescopic chute comprises an inner member 15 and an outer member 16, the rear end of the latter embracing the forward end of the former. The rear or inner chute member 15 is provided at its rear end with a housing 17 which embraces the lower end of the lower leg member 11 and projects an appreciable distance rearwardly of the leg,—the upper forward portion of said housing being pivotally attached, at 18, to the lower forward portion of said lower leg member 11. For the purpose of causing the material entering the telescopic chute from the depending leg, to be positively moved forward through said chute and discharge at the forward end thereof, a reciprocating pusher 19 is provided in the rear or inner portion of the chute and operates to push the material forwardly as it enters the chute.

A shaft 20 is mounted in the housing 17 in rear of the telescopic chute 13 and to this shaft a gear wheel 21 and a crank arm 22 are secured. Crank pins 23 are provided on the gear 21 and crank arm 22, and these crank pins are connected by means of pitmen 24 with the pusher 19 for reciprocating the latter. Motion is imparted to the gear 21 on shaft 20, from a pinion 25 on a shaft 26, and to the latter, a gear 27 is secured and receives motion from a pinion 28 on the shaft of an electric motor 29.

A bevel pinion 30 is mounted loosely on the shaft 26 and is adapted to be locked thereto by means of a suitably constructed magnetic clutch 31 to cause motion to be transmitted by said pinion to a bevel pinion 32 on a shaft 33. This shaft is supported in suitable bearings under the inner chute member 15. The shaft 33 is made with a threaded portion extending under the outer chute member 16 and passes through a threaded lug 34 on the latter. It is apparent that when the pinion 30 is locked to the shaft 26 by the magnetic clutch 31, motion will be transmitted from the motor to the threaded shaft 33 and that the outer chute member 16 will be moved outwardly or inwardly, according to the direction of rotation of the armature of the motor, to lengthen or shorten the telescopic chute.

Mounted within the housing 17 (preferably in a plane above that of shaft 20,) is a shaft 35, to which latter, a drum 36 is secured. A cable 37 is wound on said drum and extends therefrom upwardly over a pulley 38, mounted on a shaft 39 supported by a bracket secured to the lower member 11 of the depending leg. From the pulley 38, the cable extends downwardly and, after passing about a pulley 41 on a shaft 42 secured to the rear end of housing, extends again upwardly and over another pulley mounted on the shaft 40. From the last-mentioned pulley, the cable 37 extends downwardly and is secured to the shaft 42 at the rear end of the housing. A gear wheel 43 is secured to the shaft 35 and meshes with a pinion 44 normally loose on the shaft 20. A magnetic clutch 45 is provided for locking this pinion to its shaft when it is desired to rotate the drum 36, and the rotation of the latter is controlled by means of a magnetic clutch 46,—the latter being provided with a pinion 47 meshing with the gear 43.

The weight of the housing 17 and the mechanism therein, is sufficient to overbalance the telescopic chute 13, but the latter may be held at any desired angle by the action of the magnetic brake 46 which will prevent rotation of the drum 36.

When the pinion 44 is locked to the shaft 20 by the action of the magnetic clutch 45 and the motor is operated in one direction, the drum 36 will be rotated to wind the cable 37 thereon. The effect of this will be to raise the housing 17 on its pivotal support 18 and lower the telescopic chute so as to cause the latter to be inclined downwardly, in which position it can be maintained (at any desired angle) by the action of the magnetic brake 46 after the clutch 45 shall have been operated to disconnect the drum from the driving power of the motor. When it is desired to raise the telescopic chute from a downwardly inclined or depressed position to a horizontal position or to incline it upwardly; this can be readily accomplished by releasing the brake 46, when cable will be permitted to unwind from the drum 36, as the weight of the housing 17 and its contents causes said housing to descend (turning on the pivotal support at 18) and the telescope to ascend.

It has been hereinbefore stated that the lower member 16 of the depending leg is revolubly mounted in the upper member of said leg and it is apparent that by turning said lower leg member, the telescopic discharge chute can be made to project in any desired direction under the deck of a boat. For accomplishing such rotary movement of the lower leg member and the discharge chute carried thereby, the mechanism now to be described may be employed.

Within the house or cage 9 at the upper end of the leg member 10, an electric motor 48 is located and the shaft of this motor is provided with a pinion 49 which meshes with gears 50—51 on shafts 52—53, said gears being connected with the shafts by means of suitable clutches. The shaft 52 is provided with a worm 54 meshing with a worm wheel 55 at the upper end of a vertical shaft 56. This vertical shaft is mounted in suitable bearings in the house 9 and on the fixed leg member 10 and is provided at its lower end with a pinion 57 meshing with a gear wheel 58 supported in bearings on the leg member 10. The gear 58 meshes with a gear ring 59 on the lower leg member 11 for transmitting motion thereto. Thus it will be seen that the lower leg member 11 can be rotated by the motor 48, through the medium of the gearing above described, for the purpose of projecting the telescopic discharge chute in different directions.

For the purpose of swinging the depending leg outwardly or inwardly on the pivotal support 9ª, I utilize the motor 48, gear 51 and shaft 53 and employ the additional mechanism which will now be described.

The shaft 53 projects at one end beyond the house or cage 9 and is provided with a worm 60. A shaft 61 is mounted in bearings on the exterior of the house or cage 9 and this shaft is disposed at right angles to and below the shaft 53. A worm wheel 62 is secured to the shaft 61 and receives motion from the worm 60. This worm gearing is protected by a casing 63. A shaft 64 is mounted in bearings on the leg member 10 and carries gears 65 receiving motion from pinions 66 on the shaft 61. The shaft 64 also carries pinions 67 which mesh with toothed segments 68 secured to the outlet end of the apron 2 and disposed concentric with the pivotal connection of the leg member 10 with said apron. With this construction, it is apparent that when the gear 51 is locked to the shaft 53 and the motor 48 started, motion will be imparted to the pinions 67 and the coöperation of these pinions with the segments 68 on the apron, will cause the depending leg to be swung on its pivotal connection with the apron 2.

Any suitable controlling mechanism may be located in the operator's house or cage 9ª for controlling the various motors and clutches of the trimming mechanism.

Suitable circuit connections will be provided for the various electrically operated devices, but as the specific construction and arrangement of the circuits and controlling appliances therefor do not constitute any part of my present invention, their disclosure herein is not essential.

With the use of my improvements, coal or other material can be distributed under the decks of a boat and said material can be discharged in any portion of the boat at the will of the operator, so that during the operation of loading, the load can be so distributed as to properly "trim" the boat.

By raising or lowering the pan or apron 2, the trimming mechanism can be raised or lowered bodily, or, by swinging the pan or apron on its pivotal support only, the trimming mechanism can be removed entirely from the boat. The operator in the house or cage 9 can cause the lower leg member to be rotated to swing the discharge chute in a general horizontal plane, or he can cause said discharge chute to be tilted in an upward or downward direction, or to be lengthened or shortened, as occasion may require, or he can cause the depending leg carrying the discharge chute to be swung outwardly or inwardly.

Various slight changes might be made in the details of construction of my invention without departing from the spirit thereof, or limiting its scope, and hence I do not wish to restrict myself to the precise details herein set forth.

Having fully described my invention what I claim as new and desire to secure by Letters-Patent, is:—

1. In a machine of the character described, the combination with a depending tubular member and a laterally projecting chute at the lower end thereof, of a tilting housing pivotally supported by said depending member and supporting said chute.

2. In a machine of the character described, the combination with a depending tubular member, and a laterally projecting telescopic chute at the lower end thereof, of a tilting housing pivotally supported by said depending member and supporting said chute, and operating means carried by said housing for lengthening and shortening said chute.

3. In a machine of the character described, the combination with a depending tubular member, of a telescopic chute supported by said depending member and projecting laterally therefrom, a reciprocating pusher at the rear end of said chute and means for reciprocating said plunger.

4. In a machine of the character described, the combination with a depending tubular member, of a laterally projecting chute at the lower end thereof, a housing pivotally supported by said depending member and supporting said chute, a reciprocating pusher at the rear end of the chute, and means in said housing for reciprocating said pusher.

5. In a machine of the character described, the combination with a depending tubular member, of a laterally projecting chute at the lower end thereof, of a housing pivotally supported by the depending member and supporting said chute, and means located in said housing and coöperating with the depending member for turning said housing on its pivotal support for adjusting the laterally projecting chute vertically.

6. In a machine of the character described, the combination with a depending member of a laterally projecting chute at the lower end thereof, a housing pivotally supported by said depending member and supporting said chute, a drum mounted in said housing, a cable wound on said drum and having operative connection with the depending member and said housing, a motor in the housing, means for operatively connecting said motor and drum, and a brake for the drum.

7. In a machine of the character described, the combination with a depending tubular member, of a housing pivotally supported by said depending member and projecting rearwardly therefrom, a chute carried by said housing and projecting laterally therefrom beyond the pivotal support of the housing, mechanism in the housing coöperating with the depending member to raise the housing and lower the chute, said housing and mechanism therein being sufficient to overbalance the chute, and a brake coöperating with said mechanism to hold the housing and chute and to permit the descent of the housing to raise the chute.

8. In a machine of the character described, the combination with a depending tubular member, of a telescopic chute supported by and projecting laterally from the lower end of said depending member, screw mounted on one member of said chute and operatively connected with the other member thereof, a motor, and gearing between said motor and screw.

9. In a machine of the character described, the combination of a depending tubular member, a laterally projecting chute having pivotal connection with said depending member, means for tilting said chute, and means for turning the depending member and the chute carried thereby.

10. In a machine of the character described, the combination with a depending tubular member, of a housing pivotally supported by said depending member, a laterally projecting chute supported by said housing, means for turning said housing on its pivotal support to adjust the chute in a vertical direction, a pusher at the rear end of said chute, and means for reciprocating said pusher.

11. In a machine of the character described, the combination with a depending tubular member, and a housing pivotally supported by the lower portion of said depending member, of a telescopic laterally projecting chute carried by said housing, means for tilting the housing to tilt the chute vertically, a reciprocating pusher in the rear end of the chute, means in the housing for operating said pusher, and means for turning said depending member.

12. In a machine of the character described, the combination with a revoluble tubular depending member, and means for rotating said member, of a housing pivotally supported by said member, a laterally projecting telescopic chute carried by said housing, means for tilting the housing, a pusher in the chute, and means in the housing for reciprocating the pusher, whereby said pusher may be operated regardless of the inclination of said telescopic chute.

13. In a machine of the character described, the combination of a leg pivotally supported to tilt forwardly and backwardly and comprising two members, means for rotating the lower leg member, and a laterally projecting chute pivotally supported by the revoluble leg member.

14. In a machine of the character described, the combination with supporting means, and means for raising and lowering said supporting means, of a depending leg pivotally supported by said supporting means to tilt forwardly and backwardly and comprising two members, means for rotating the lower leg member, and a laterally projecting chute carried by the revoluble leg member and comprising adjustably connected members.

15. Load trimming mechanism comprising a depending leg comprising two members, means for raising and lowering said leg, means for swinging the leg, means for rotating the lower leg member, a laterally projecting chute carried by the revoluble leg member, and means for tilting said chute in a vertical direction.

16. In a machine of the character described, the combination with a pan or apron and supporting means therefor, of a leg comprising an upper member having pivotal connection with the pan or apron, and a revoluble lower member, of a laterally projecting telescopic chute pivotally supported by the revoluble leg member, means for rotating said revoluble leg member, and means for tilting the laterally projecting chute.

17. In a machine of the character described, the combination with a pan or apron and supporting means therefor, of a leg communicating with said pan or apron and comprising an upper member pivotally connected with the pan or apron, and a lower revoluble member, of mechanism on the upper leg member for rotating the lower leg member, means on the upper leg member and operatively associated with the pan or apron for swinging said leg, a laterally projecting chute pivotally supported by the lower revoluble leg member, and means for tilting said chute.

18. In a machine of the character described, the combination with a pan or apron and a tubular leg communicating therewith and pivotally supported thereby, of toothed segments on the pan or apron, a shaft mounted on the leg, pinions meshing with said segments, a motor carried by the pivoted leg, and gearing between said motor and shaft.

19. In a machine of the character described, the combination with a tubular leg comprising an upper member and a revoluble lower member, means for supporting said leg, and a laterally projecting chute carried by the revoluble leg member, of a motor supported by the upper leg member, a vertical shaft mounted on said upper leg member, gearing between the upper end of said shaft and the motor and gearing between the lower end of said shaft and the revoluble leg member.

20. In a machine of the character described, the combination with a pan or apron, a leg comprising an upper member pivotally supported by said pan or apron and a lower revoluble member, and a laterally projecting chute carried by the revoluble leg member toothed segments on the pan or apron, gearing between said segments and the motor, a vertical shaft on the upper leg member, gearing between the upper end of the vertical shaft and the motor, and gearing between the lower end of the vertical shaft and the revoluble leg member.

In testimony whereof, I have signed this specification in the presence of two subscribing witnesses.

GEORGE H. HULETT.

Witnesses:
HERBERT P. GLIDDEN,
H. A. PELOUBET.